US011838357B1

(12) United States Patent
Kumar et al.

(10) Patent No.: US 11,838,357 B1
(45) Date of Patent: Dec. 5, 2023

(54) INCREMENTAL STREAM SWITCHING IN DISTRIBUTED SYSTEMS

(71) Applicant: Amazon Technologies, Inc., Seattle, WA (US)

(72) Inventors: Ankit Kumar, Bellevue, WA (US); Dan Popick, Seattle, WA (US); Sandesh Sanjeev, Seattle, WA (US); Meng Li, Seattle, WA (US); David Michael Hulme, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/388,660

(22) Filed: Jul. 29, 2021

(51) Int. Cl.
  *H04L 67/1025* (2022.01)
  *H04L 67/1014* (2022.01)
  *H04L 67/1029* (2022.01)

(52) U.S. Cl.
  CPC ...... *H04L 67/1014* (2013.01); *H04L 67/1025* (2013.01); *H04L 67/1029* (2013.01)

(58) Field of Classification Search
  CPC ............ H04L 67/1014; H04L 67/1025; H04L 67/1029
  See application file for complete search history.

(56) References Cited

U.S. PATENT DOCUMENTS

| 2010/0122305 | A1* | 5/2010 | Moloney | ............... | G06Q 30/00 725/54 |
| 2018/0192144 | A1* | 7/2018 | McElroy | ........... | H04M 1/72448 |
| 2021/0377458 | A1* | 12/2021 | Xiong | .............. | H04N 21/23608 |

* cited by examiner

*Primary Examiner* — Ryan J Jakovac
(74) *Attorney, Agent, or Firm* — NICHOLSON DE VOS WEBSTER & ELLIOTT, LLP

(57) ABSTRACT

Techniques for incremental stream switching in a distributed system with flip events are described. A special-purpose flip event is inserted into an event stream that indicates, to recipients of the stream, whether they are to switch to use of an alternate event stream. The flip event may identify which other event stream to use, how to obtain events of that event stream, when to switch to the other event stream, and/or whether that particular recipient is to switch. The recipients may be selectively or iteratively migrated using flip events targeting different recipients, limiting the blast radius of a switch. Via use of a tracking data structure, event replay and event skips can be avoided.

20 Claims, 10 Drawing Sheets

FLIP EVENT 400

| TYPE: | FLIP |
|---|---|
| RECIPIENTS: | DP*.EXAMPLE.COM |
| SOURCE_STREAM_ID: | OLD-1.EXAMPLE.COM/STREAM_Z |
| SOURCE_EVENT_ID: | 123 |
| FLIP_EVENT_ID: | 198 |
| TARGET_STREAM_ID: | NEW-1.EXAMPLE.COM/STREAM_X |
| TARGET_EVENT_ID: | ABCDEF |

*FIG. 4*

OPERATIONS
700

```
OBTAINING, BY A PROCESS EXECUTED BY AN ELECTRONIC
DEVICE, A PLURALITY OF EVENTS BELONGING TO A FIRST EVENT
STREAM 702
```
↓
```
DETERMINING, BY THE PROCESS, THAT A FIRST EVENT OF THE
PLURALITY OF EVENTS IS A FLIP EVENT INDICATING THAT THE
PROCESS IS TO SWITCH FROM THE FIRST EVENT STREAM TO A
SECOND EVENT STREAM, THE FLIP EVENT INCLUDING AN
IDENTIFIER OF A SECOND EVENT WITHIN THE SECOND EVENT
STREAM 704
```
↓
```
SWITCHING, BY THE PROCESS, FROM THE FIRST EVENT STEAM TO
THE SECOND EVENT STREAM, THE SWITCHING INCLUDING
OBTAINING A SECOND PLURALITY OF EVENTS OF THE SECOND
STREAM BASED AT LEAST IN PART ON USE OF THE IDENTIFIER OF
THE SECOND EVENT 706
```

INCREMENTAL STREAM SWITCHING IN DISTRIBUTED SYSTEMS

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies can provide virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Modern cloud provider networks have grown very large in terms of size as well as in terms of the numbers of services offered and customers involved. In such systems, huge amounts of computing resources are deployed in large numbers of locations that all must cooperatively work to provide a coherent logical view of the provider network's services. Thus, it is imperative that these resources can communicate efficiently and effectively to avoid service disruptions or other negative effects to user resources and workloads.

BRIEF DESCRIPTION OF DRAWINGS

Various embodiments in accordance with the present disclosure will be described with reference to the drawings, in which:

FIG. 4 is a diagram illustrating values of an exemplary flip event data structure according to some embodiments.

FIG. 7 is a flow diagram illustrating operations of a method for stream switching according to some embodiments.

DETAILED DESCRIPTION

Figure 1:
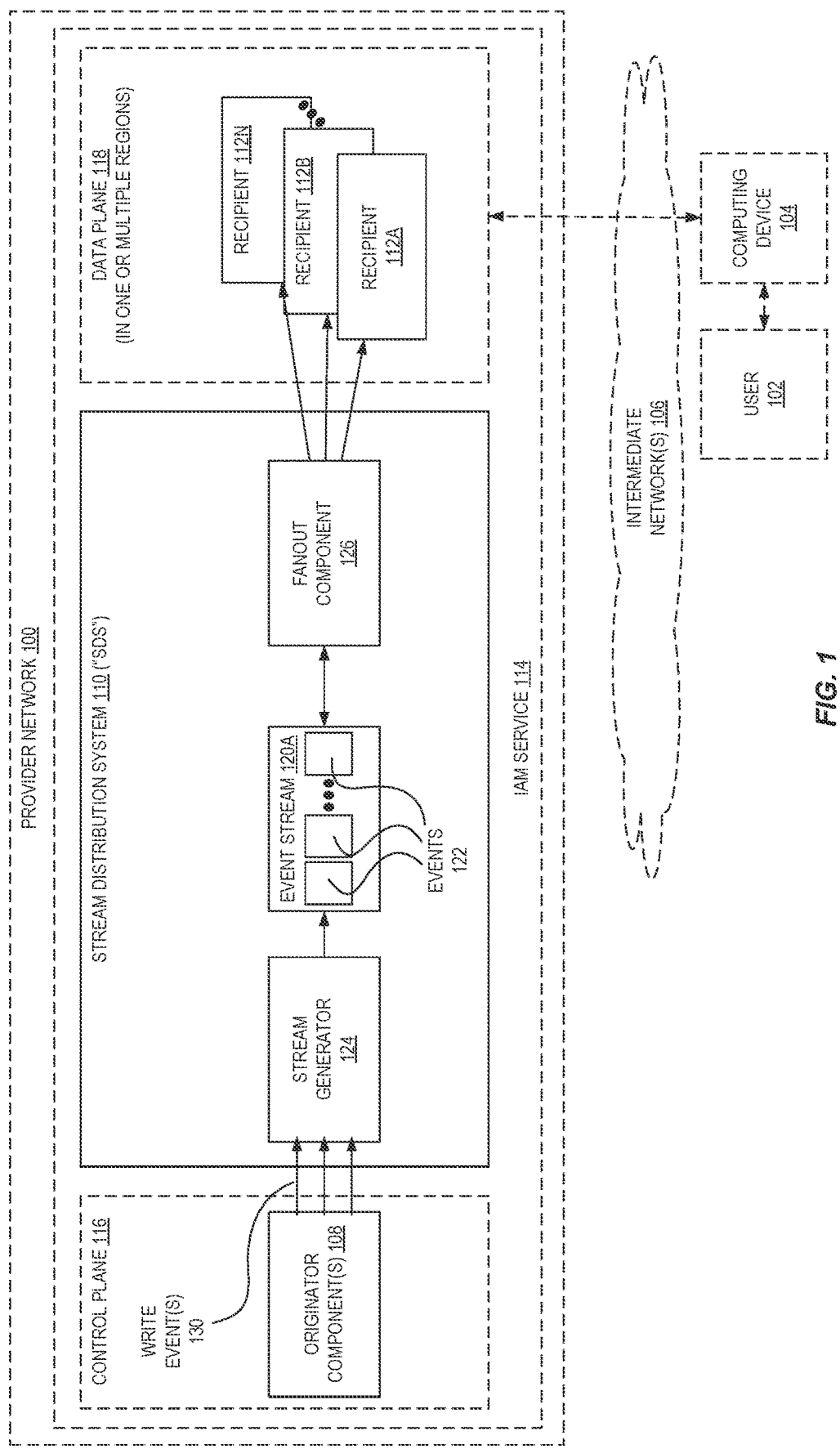
FIG. 1 is a diagram illustrating inter-component communication in a distributed system via an event stream.

The present disclosure relates to methods, apparatus, systems, and non-transitory computer-readable storage media for incremental stream switching in a distributed system. According to some embodiments, a system utilizing an event stream to communicate with multiple recipients can easily and safely switch some or all of the recipients to instead read from one or more other different event streams—optionally with their events having different numberings, orderings, etc.—in a safe manner through use of special flip events, avoiding occurrences where the recipients might otherwise replay events or skip events. A flip event in some embodiments is a special-purpose type event inserted directly into an event stream that indicates to a recipient that it may need to switch to use of a different event stream. Thus, a flip event may be a data structure (similar to other event data structures within an event stream) that carries an instruction to a consumer of the event stream that allows the consumer to be able to find a position in an alternate stream, allowing it to flip from a first stream to the alternate stream. The flip event, in some embodiments, provides an indication of which one or more recipients are to perform this flip, while optionally allowing other recipients to continue use of the existing event stream, allowing for phased migrations from one event stream to another, partitioning of certain recipients (or writers of events) to different event streams, etc., without impacting the performance of all recipients. A flip event may include other useful information for the recipient, such as an identifier of which other event stream is to be read from (e.g., in terms of a stream identifier, a resource identifier, or the like), an identifier of which event from that new event stream the recipient is to begin processing from (as a "highwater mark" event), an indication of when the recipient is to switch streams (e.g., via an event identifier of the current stream that is to be the last processed before switching), etc. Various embodiments, via use of particular flip event-based techniques described herein, may thus provide a consistent way for recipients to jump to a new event stream at a same point, provide replay protection and gap detection, provide safe rollback mechanisms, and/or provide the system with configurable control of the blast radius (or, which recipients are switched over at a point in time) for an event stream switch.

By way of example, one potential deployment within a multi-tenant cloud provider network may involve a control plane type entity providing updates (or mutations) of system state—such as messages indicating the creation of user accounts, the creation and association of encryption keys, or the like—via an event stream to potentially a large number of data plane recipient components (e.g., that update a database based on those events, or that otherwise act based on the events) that are distributed across potentially many different deployment locations (e.g., to multiple availability zones in one or multiple regions of the provider network). The provider network may seek to switch ones or all of these recipients to instead read from a different event stream (or potentially multiple different event streams) for a variety of reasons, such as to upgrade or change the event stream system (or an event stream) itself, move various recipients or stream writers to different streams, etc. Thus, potentially without requiring separate out-of-band control plane type signaling, a special-purpose "flip event" can be added to the existing stream (i.e., in an "in-band" manner) that indicates to ones of the recipients that they are to switch to use of a new stream. Thus, regardless of the clock timing when each of these potentially many different recipients is notified of the switch, all affected recipients can make a consistent switch without issues such as missing events, replaying events, or the like.

Through techniques described herein, the overall correctness and consistency of a stream distribution system may be improved by avoiding the potential erroneous double processing of events, missed events, etc., resulting from a switch using previous techniques. Moreover, via techniques described herein, the overall operational speed and efficiency of the system can similarly be improved for similar reasons, and the stability of a system can be preserved even in the event of a problematic event stream switch, in that a switchover may be made in a simple, phased manner that provides a small "blast radius" for the change allowing any negative effects to be detected by changing over a small sample set of recipients.

FIG. 1 is a diagram illustrating inter-component communication in a distributed system via an event stream. In this example, a stream distribution system 110 ("SDS") is utilized by an originator component 108 to provide an event stream of data to a set of recipients 112A-112N, which may include a single recipient or event tens, hundreds, thousands, or more recipients. Generally, an event stream (or "data stream") may be a series of data points or data units generated by one or more sources and provided to one or more recipients or consumers of the event stream. An event stream may have an associated identifier (e.g., a stream name or other stream identifier), and this identifier may thus be associated with a set of values (the "events" or elements of the stream), each of which may optionally have a corresponding timestamp.

The SDS 110, in some embodiments, is implemented within a service of a multi-tenant cloud provider network 100. A provider network 100 (or, "cloud" provider network) provides users (e.g., user 102) with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc.

The users (or "customers") of multi-tenant cloud provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane (e.g., control plane 116) of the provider network 100 that includes "backend" services supporting and enabling the services that can be more directly offered to customers (e.g., via data plane 118).

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (or simply, a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of a cloud provider network 100 via a publicly accessible intermediate network 106 (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations, such as transferring customer data to and from the customer resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

The originator component 108, in one example, may be implemented as one or multiple software modules of a service of a multi-tenant cloud provider network 100, such as an Identity and Access Management (IAM) service 114 that allows users (e.g., user 102) to create and manage provider network user accounts, groups of user accounts, and permissions that control (e.g., allow and deny) user access to resources provided by the cloud provider network 100, etc. The originator component 108 can, for example, be a logically centralized part of a control plane 116 of the IAM service 114 that sends out information to the set of recipients 112A-112N about system changes, e.g., the creation of a user account, the modification of a permission associated with the user account, the creation of a user group and/or an addition or removal of a user account to a user group, the creation of an security-related policy or encryption key associated with a user account or user group, etc. This inter-component communication may occur via use of an event stream 120A created and distributed by a SDS 110 to the recipients 112, which may include one but typically many recipients, and which may be located in one location or multiple locations, potentially within multiple different availability zones and/or regions of the provider network 100.

Thus, an originator component 108 may send "write event" command messages 130, to the SDS 110, corresponding to updates of the service that are to be communicated to the set of recipients 112A-112N. The SDS 110 may utilize a stream generator 124 component (e.g., implemented by one or more software modules executed by one or more host devices in one or more deployment locations) that, based on each "write event" message 130, inserts one or more events 122 into a particular event stream 120A (e.g., associated with and/or created by the originator component 108). These events 122 are then obtained by a fanout component, which may be implemented as one or multiple software agents that collectively detect new events (e.g., by monitoring, notification, etc., in a push and/or pull model) in one or more event streams 120 and transmit (or otherwise make available) these events to recipients 112 that seek updates of the event stream. Typically, a single (logical) fanout component 126 may thus "fan out" each single event stream into multiple copies of the stream provided to multiple recipients 112.

In many cases, the ordering of events 122 in an event stream 120 is important to ensure consistent and/or proper operation of the set of recipients 112. For example, in the example IAM service 114 described herein, it is important that a first event pertaining to the creation of a new user account is sent and then received and processed by the recipients before they receive and process an event corresponding to a change associated with that user account (e.g., a change of permissions, the creation of an access key or encryption key, etc.). If these events are received out of order (by some or all of the recipients), the system could be in an inconsistent and "buggy" state for a period of time. As one specific example, a first event may seek to add a permission for a user account to access some file or files, and then later a second event may be added to remove that permission. If these are received out of order, it may be the case that the recipients (wrongly) process the second event first (e.g., removing a non-existent permission silently), which may cause errors, or potentially, may allow the later-arriving first event to later be processed that gives the user account continuing access to the file(s). Such SDS 110 type systems can handle these ordering requirements gracefully, e.g., via the use of event identifiers that may indicate the ordering of the events—such as through monotonically increasing numeric event identifiers associated with each event in an event stream that can allow recipients to easily detect which event is before or after another via a numeric ordering.

Though this system works well, it can be further improved. In this system it may be difficult to add additional originator components into a stream, insert events from multiple originators into a single stream in different orderings, etc. For example, if the originator component 108 changes from a single codebase (or database) that produces a single ordering of events into a different codebase (or use of multiple databases) that instead serializes different events in one stream, the ordering may be lost and create problems for recipients. Additionally, this system does not easily handle use cases where the originator component 108 or event stream 120A itself changes in some manner.

For example, if some change to the originator leads to a new event stream being generated (in place of, or in addition to, the original event stream), it is unclear how to get potentially thousands (or more) of recipients to reliably switch over to this new second stream, without reapplying events, or skipping events, etc.

Figure 2:
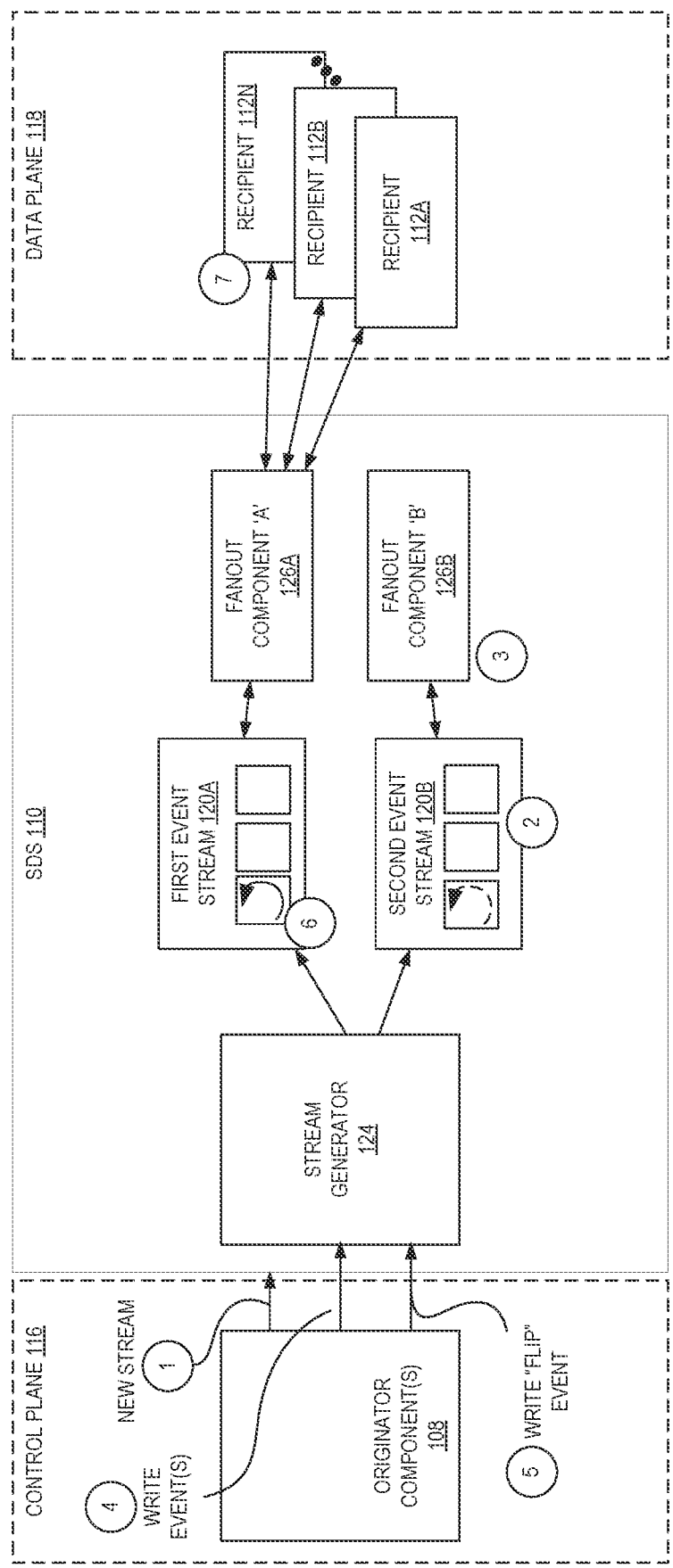
FIG. 2 is a diagram illustrating an environment for incremental stream switching in a distributed system with flip events according to some embodiments.

To this and other ends, FIG. 2 is a diagram illustrating an environment for incremental stream switching in a distributed system with flip events according to some embodiments. In this example, the SDS 110 is able to allow the originator component 108 toggle between two (or more) event streams while resolving potential mis-ordering issues. In some embodiments, an originator component 108 may send a special type of message or event into the event stream that, when received by the recipient, may instruct it that it is to switch to use of a new stream, and may further tell it when to switch and how to make the switch. In this manner, each recipient may be individually or collectively instructed to switch to a new stream, using an inline communication channel (e.g., via an event within the stream itself, instead of requiring some out-of-band control plane type signaling), in a phased/gradual or complete transition.

For example, as shown at circle (1), an originator component 108 may desire to switch one, some, or all of the event stream recipients 112 to a new event stream, which may include fewer events than the first event stream 120A, more events, the same events (though possibly with different orderings), etc., and send a "new stream" type message to the SDS 110.

In response, the SDS 110 (e.g., by a non-illustrated orchestration component, via the stream generator 124, etc.) may create resources for a second event stream 120B (e.g., create database records/metadata for an event stream) as shown at circle (2) and may further generate a new fanout component 'B' 126B (e.g., launch one or more applications, compute instances, functions, etc., that are configured to distribute events of the event stream) for the stream as shown at circle (3). For some period of time, the originator component 108 (which again, may include multiple originator components/writers) may write to both the original first event stream 120A and the second event stream 120B.

At some point, the originator component 108 may cause ones of the recipients to switch from use of the first event stream 120A to the second event stream 120B via writing a special "flip" event to at least the first event stream 120A as shown at circle (5). In some embodiments, the flip event is only written to the first event stream 120A (e.g., as shown by an event box with a circular arrow within it) though in other embodiments the flip event may be written to the first event stream 120A and also the second event stream 120B (as shown by the event box with a dashed line circular arrow).

Upon one or more of the recipients 112 obtaining this flip event in the typical course of processing events from the event stream (e.g., by performing application-specific actions based on the events), the recipient 112 can determine that the event is indeed a flip event and obtain information regarding the "flip" it may need to perform from within the event.

Figure 3:
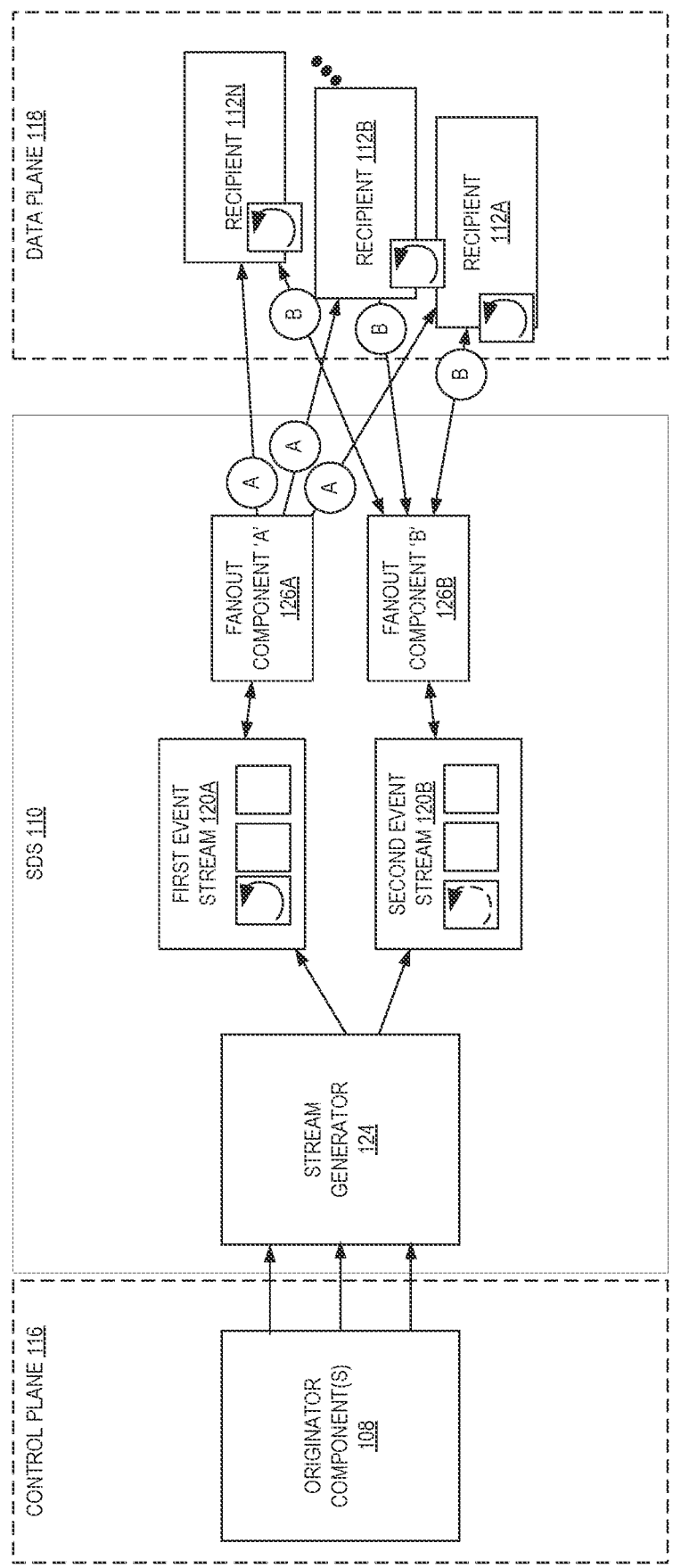
FIG. 3 is a diagram illustrating recipient stream switching operations within an environment for incremental stream switching in a distributed system according to some embodiments.

For example, as shown in FIG. 3, as each flip event is provided to the respective recipients 112A-112N (again, via regular event transmission in-band, as is performed for regular events) as shown by circle (A), the recipients 112A-112N can determine that the event is in fact a flip event (e.g., by detecting a "type" of the event, such as by a unique "type id" for flip events or other signature within the event) and analyze the flip event to determine if it is to "flip" to a new event stream, and if it is to flip, how to perform the flip and when to perform the flip.

For example, one exemplary type of flip event is shown in FIG. 4. In this example, a flip event 400 data structure includes a type value (here, shown as "FLIP") indicating that the event is a flip event, though other type values may be used in other cases and thus this is to be understood as being exemplary. The flip event 400 may also include a source stream identifier (here, "OLD-1.EXAMPLE.COM/STREAM_Z") and a source stream event identifier (here, "123" that corresponds to the key "SOURCE_EVENT_ID") indicating which event within the event stream the flip event 400 is.

In some embodiments, the flip event 400 may also include a flip event identifier (here, "198") indicating when to perform a flip—that is, at what point, within the existing stream, the recipient is to changeover to the new event stream. Thus, assuming the event IDs within the source event stream are sequential integers, the recipient is to continue obtaining and processing events (e.g., events 124, 124, 125, et seq.) until reaching an event having an event ID of "198". The system may be adapted to perform the switch either before processing that event "198", or after processing that event "198". However, in some embodiments a flip event identifier may not be used, and thus the recipient is to perform a flip immediately, or after a predetermined number of additional events have been processed (e.g., after ten more events), or the like.

The flip event 400, in some embodiments, includes a "watermark" event identifier (here, a key of "TARGET_EVENT_ID" associated with the value "ABCDEF") indicating a particular event, for the new event stream, that the recipient is to begin processing at. This value ("ABCDEF") may be associated with a same event that exists in both streams, though it may be referenced by a different identifier in the existing/old stream (e.g., "123"). In further embodiments, both this flip event 400 (having event ID="123") and a corresponding event in the target stream (having event ID="ABCDEF") may each be associated with a origination event identifier, e.g., generated by an originator component of the stream and that can refer to an event in one or multiple different streams that embody this same event. With this target event identifier, the recipient may seek to obtain events from the new stream occurring in that stream at or after that value (e.g., a request may be sent by the recipient asking for new events starting at event ID "ABCDEF"), obtain events beginning with events prior to that event ID (e.g., begin obtaining events that are some number of events prior to that event, which allows for out-of-order unprocessed events to be processed), or may simply obtain a recent history of events (e.g., a last twenty-four hours of events, or one hour of events) and ignore/discard them until reaching the watermark event identifier.

In some embodiments, the flip event 400 includes a target source identifier and/or stream identifier providing sufficient detail to the recipient to allow the recipient to obtain events for the new event stream. As shown, the flip event 400 includes a TARGET_STREAM_ID value that provides both pieces of information—here, a target source identifier of "NEW-1.EXAMPLE.COM" provides a hostname (or similar value that can be used to resolve to a particular resource) that identifies a particular fanout component, and a stream identifier of "STREAM_X" provides a name of the new stream. In some embodiments, such as where a fanout component only provides events for a single stream, a stream identifier may be unnecessary and similarly, in some embodiments a stream identifier may be provided without a source identifier such as when there is only one fanout component or the recipient can otherwise resolve the source using the stream identifier (e.g., by querying a lookup service with the stream identifier to obtain a network address or hostname of the associated fanout component).

As indicated herein, in some embodiments each new stream may be created along with its own dedicated fanout component (e.g., a cluster of one or more virtual machines, containers, applications, etc., that send out events to interested recipients). This can provide increased system stability and efficient processing, in that any problems introduced with regard to a new stream may be constrained to that fanout component instead of affecting the existing fanout component used by a previous stream. Thus, for example, a system may seek to switch ones of the recipients over to a new stream in a phased migration, e.g., to "test out" the migration with a limited number of recipients to ensure no problems arise, and then migrate remaining recipients (still using the "old" event stream) later in one or more additional waves to the new event stream. This allows the originator component 108 and control the "blast radius" of a change to an event stream by limiting how many recipients at a time are switched to a new event stream.

To this end, in some embodiments the flip event 400 includes a target recipient value (here, the key of "RECIPIENTS" that has a value of "DP*.EXAMPLE.COM") providing information that can specifically or generally indicate which recipients of the event stream are to perform a switch according to this flip event. In this example, the target recipients value indicates that any recipients having a hostname matching the pattern of "DP*" (e.g., DP01.EXAMPLE.COM, DP02.AZ1.REGION2.EXAMPLE.COM, etc.) are to perform a flip using this flip event data, and thus the value does not literally identify specific recipients but instead identifies a class of recipients, where the recipients can determine whether they are members of the class. In this or other embodiments, the target recipient value may thus include logic that can be evaluated by the recipient to determine whether the flip event applies to it, and may include a list of one or more hostnames, a wildcard value, regular expression, geographic location, deployment location, etc. In some embodiments, the target recipient value may include an identifier of one or more AZs (and thus, any process or host located within a specified AZ is to switch), one or more regions (and thus, any process or host located within a specified region is to switch), or the like. In some embodiments, multiple types of values may be used together within a target recipients value; e.g., both an identifier of a set of one or more AZs, as well as a wildcard value (e.g., DP*.EXAMPLE.COM), where both must be satisfied for the flip event to apply—that is, the recipient must be within the specified AZ(s) and also have a hostname that matches the wildcard.

In the case of phased event stream flips, the originator component 108 may thus insert multiple flip events into the original event stream with different target recipient values (and likely different values for the other fields as well) to cause different groupings of recipients to perform the flip.

Figure 5:
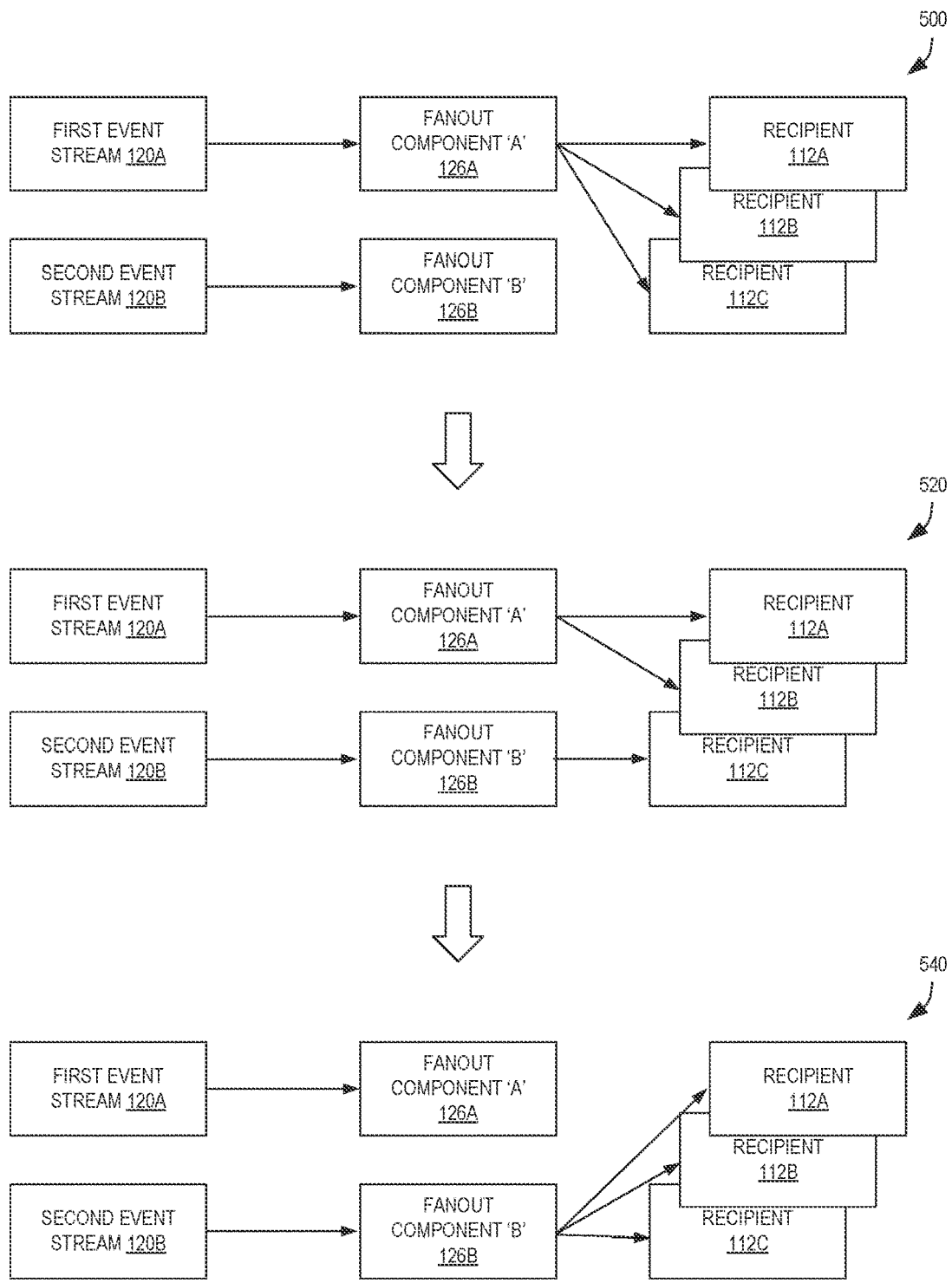
FIG. 5 is a diagram illustrating incremental stream switching of a distributed system according to some embodiments.

For example, FIG. 5 is a diagram illustrating incremental stream switching of a distributed system according to some embodiments. Using techniques described herein, a single recipient (or small set of recipients) within a first AZ may be targeted to test out the flip, and thereafter all recipients within a particular AZ may be targeted, and then all recipients in a particular region may be targeted, and then recipients in other regions (or the entire provider network) may be targeted. As shown, at 500 a set of three recipients 112A-112C are utilizing a first event stream 120A via a fanout component 'A' 126A, and at some point, via a flip event targeting a single one of these recipients (here, recipient 112C), at 520 this single recipient 112C is obtaining events from a second event stream 120B via fanout component 'B' 126B. At some point in time, such as when a threshold amount of time has passed (to allow for the detection of problems or failures), other recipients may be flipped over to the new stream—here, at 540, all three recipients 112A-112C are now utilizing the second event stream 120B via fanout component 'B' 126B.

Thus, turning back to FIG. 3, as shown by circle (B) each recipient (at a same or different point in processing the stream, as described above) may switch to obtain events of the new event stream from a different fanout component 'B' 126B.

Eventually, if and when all recipients are migrated to a new event stream, the original event stream 120A and/or fanout component 'A' 126B may be shut down or terminated.

These techniques can similarly and beneficially be applied for different scenarios. For example, in some cases where an event stream includes events pertaining to multiple users/clients/originators, events pertaining to one of these may be moved away from the others into its own independent event stream. This can provide increased security or confidentiality for these users, as their events are not mixed in with events from other users, processed by common hosts/equipment, etc.

In some embodiments, the event switching can extend (e.g., in the above user-partitioning scenario, or others) to use of two, three, four, or more different event streams using these same flip event techniques, providing even further isolation of event traffic and blast radius control.

In some embodiments, in case of any failures or problems detected (or reported to originator component 108) when switching to a new event stream, a "rollback" can be easily performed by simply inputting another flip event into at least the event stream that needs to be moved away from, e.g., indicating that all recipients (e.g., via a target recipient value of "ALL" or the wildcard *) are to move back to a previous event stream.

In some embodiments, the SDS 110 itself (instead of an originator component) may insert flip events into an event stream on its own accord. As one example, the SDS 110 may detect that one originator component (of potentially many originator components in the provider network) is writing a disproportionately large amount of events to a shared event stream, and thus the SDS 110 may write a flip event to cause only recipients of the event stream that are looking for events associated with that one originator component to be moved to their own event stream and fanout component, thus reducing the load on the initial event stream, fanout component, and other recipients (that no longer need to obtain and filter out those non-applicable events). Other reasons for this type of partitioning (or de-partitioning by consolidating streams) may similarly occur on the prerogative of the SDS 110, e.g., to perform an event stream partitioning to decrease load on recipients, to perform an event stream consolidation to increase utilization (i.e., reduce wasted capacity) on the part of the fanout components and/or recipients, etc.

In some scenarios, it may be the case that a new event stream may not maintain the same ordering of events as in the original event stream. For example, instead of having a set of events 101, 102, 103, 104, 105, a new event stream may have events in an order corresponding to 101, 104, 102, 103, 105. This scenario could arise when, as one example, events 101/102/103 are ordered and pertain to a first user and events 104/105 are also ordered but pertain to a second user—thus, while these individual orderings must necessarily remain ordered (101 before 102 before 103; and also 104 before 105) the component(s) writing to the stream may have somewhat shuffled these in a different order, e.g., during a particular serialization process where events are obtained from disparate sources. Accordingly, while the individual orderings are preserved, the overall order has changed. Thus, while in some cases a simple highwater value can be used by a recipient to satisfactorily begin processing a new event stream at a particular location, in other cases where the ordering may change a further technique may be employed to avoid "replaying" an event (e.g., processing it twice—once from the old stream and once from the new).

Figure 6:
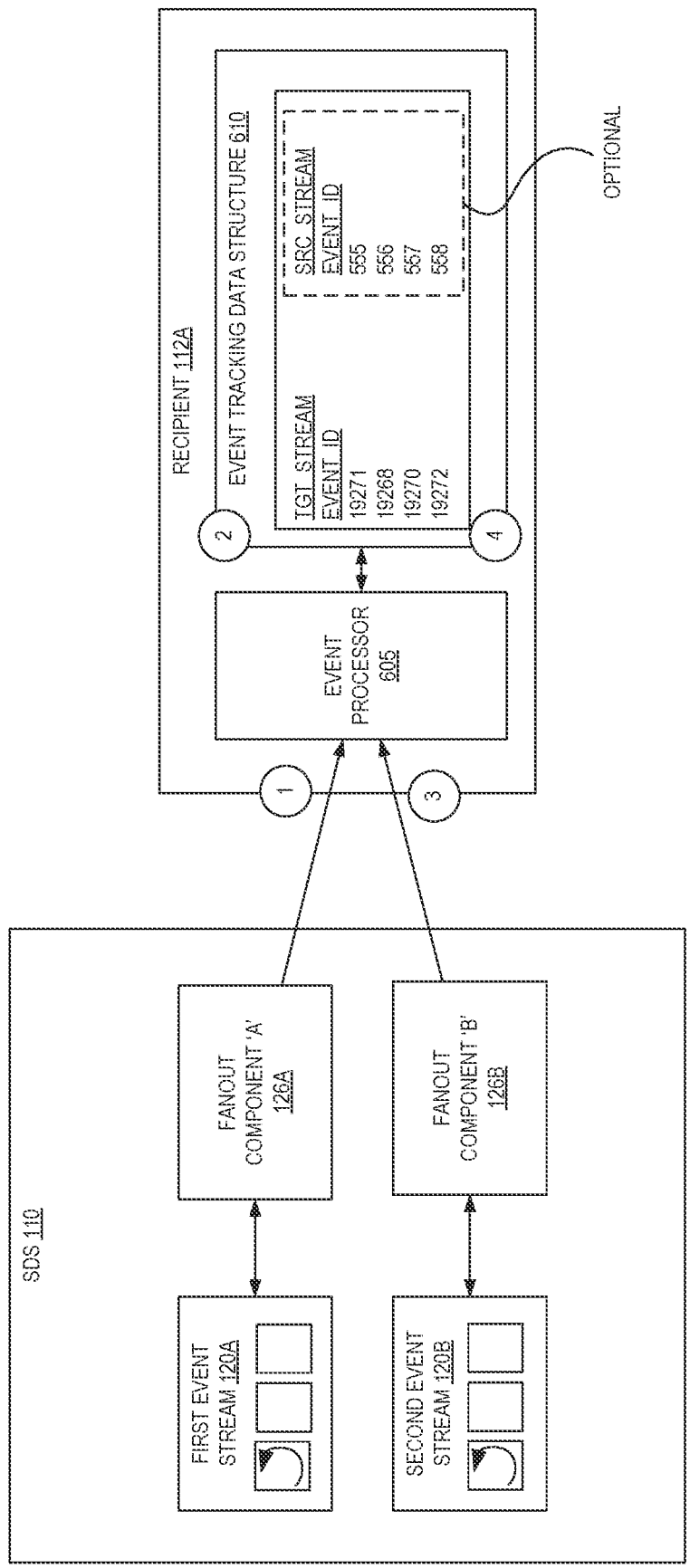
FIG. 6 is a diagram illustrating recipient safe stream switching using an event tracking data structure according to some embodiments.

To this end, FIG. 6 is a diagram illustrating recipient safe stream switching using an event tracking data structure according to some embodiments. In cases where event re-ordering may occur, a recipient 112A can safely switch event streams through use of an event tracking data structure 610. In some cases, an event processor 605 (e.g., code/logic of the recipient that acts upon events of an event stream), upon receiving a flip event indicating a forthcoming flip to a new stream, begin inserting an entry into an event tracking data structure 610 for each event it processes going forward where each entry identifies a corresponding event ID from the new stream, which may be passed in the original event stream (e.g., within each event of the source stream, an identifier of a corresponding event from the second stream is explicitly included therein, such as by an upstream component that is aware of the correspondence) or provided in another manner (e.g., the recipient 112A may query a service, with source stream event IDs, to obtain the corresponding target stream event IDs). Optionally, the event processor 605 may also store mappings between event IDs of different event streams—e.g., the source stream event ID of "555" corresponds to the target stream event ID of "19271"— which may allow the recipient 112A to retain a knowledge of this mapping for various purposes, e.g., advanced processing or switching back to use of the initial source event stream.

In other embodiments, the event processor 605 may continually update such an event tracking data structure 610 (e.g., by inserting event IDs) without any connection to the receipt of a flip event, and this data structure may be purposefully limited in size and "old" entries may be naturally erased over time (e.g., via use of a circular buffer, timestamps, or the like).

Upon flipping to use the new stream, the event processor 605 can perform a lookup into the event tracking data structure 610 (e.g., using the event ID from an event in the target stream as a lookup index) to determine whether it has already processed this event (from a corresponding event in the original, source event stream). As shown in this example, the event processor 605 can determine that, for a "new" event from the new stream with an event ID of 19272, that it has already processed that event. In some embodiments, upon such a "hit" in the event tracking data structure 610, this entry may be removed (e.g., to reclaim memory, for faster lookups, etc.), though in other embodiments it need not be removed.

After a stopping condition is satisfied, the event tracking data structure 610 is no longer needed and may be removed. The stopping condition may be implemented in various ways, such as a threshold amount of time having elapsed without any hits into the event tracking data structure 610, a threshold amount of events have been processed without any hits into the event tracking data structure 610, no entries remaining in the event tracking data structure 610, or the like.

FIG. 7 is a flow diagram illustrating operations 700 of a method for stream switching according to some embodiments. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 700 are performed by a recipient 112 of the other figures.

The operations 700 include, at block 702, obtaining, by a process executed by an electronic device, a plurality of events belonging to a first event stream. The process may be a recipient of multiple recipients executing across multiple AZs of multiple regions in a multi-tenant provider network. The obtaining may include subscribing to the first event stream and receiving the events from a first fanout component.

The operations 700 further include, at block 704, determining, by the process, that a first event of the plurality of events is a flip event indicating that the process is to switch from the first event stream to a second event stream that is different than the first event stream (e.g., includes the same events of the first event stream as well as other events, includes the same events as the first event stream but where the events are identified and/or ordered differently, etc.), the flip event including an identifier of a second event within the second event stream. The determining may include identifying a "flip event" type identifier within the first event.

The operations 700 further include, at block 706, switching, by the process, from the first event stream to the second event stream, the switching including obtaining a second plurality of events of the second stream based at least in part on use of the identifier of the second event. The switching may include sending a message to a second fanout component, using data from the first event (e.g., a hostname, network address, or other resource identifier) to obtain events of the second stream, and the message may include the identifier of the second event to indicate at what event of the second stream the process wishes to begin processing with.

In some embodiments, the flip event further includes an identifier of a third event within the first stream (e.g., a "flip event"), and the operations 700 further include, after the determining that the first event is a flip event and prior to the switching from the first event stream to the second event stream, processing additional events of the plurality of events of the first event stream until reaching or processing the third event. In some embodiments, the operations 700 further include as part of the processing of the one or more events of the first event stream, updating, by the process, a tracking data structure with entries including identifiers of other events of the second event stream. In some embodiments, the operations 700 further include after the switching from the first event stream to the second event stream, processing the second plurality of events, the processing including performing lookups into the tracking data structure for the second plurality of events to determine which of the second plurality of events have already been processed (e.g., by determining if an event ID obtained from each of the second plurality of events has an associated entry in the tracking data structure). In some embodiments, the operations 700 further include determining, by the process based on use of the tracking data structure, that a lookup stopping condition has been satisfied; and stopping the performing of lookups with the tracking data structure. In some embodiments, the lookup stopping condition is satisfied when an amount of lookup misses into the tracking data structure over a recent window (e.g., of time, of a number of events, etc.) meets or exceeds a threshold.

In some embodiments, obtaining the plurality of events belonging to the first event stream comprises receiving the plurality of events from a first fanout component; the flip event further includes an identifier of a second fanout component that is distinct from the first fanout component; and obtaining the second plurality of events of the second stream comprises transmitting the identifier of the second event to the second fanout component and receiving the second plurality of events from the second fanout component.

In some embodiments, the flip event further includes a target recipient value, and the operations 700 further include determining, by the process based on the target recipient value, that the flip event does pertain to the process and thus to perform the switching from the first event stream to the second event stream. In some embodiments, the target recipient value is one of: a set of one or more process or host identifiers that uniquely identifies one or more processes or hosts; or a value that does not directly identify any single process or host but that can be evaluated by the process to determine whether the flip event is meant for the process or host, e.g., an identifier of a group, an identifier of a deployment location (e.g., an AZ, region, edge location of the provider network, etc.), or the like.

In some embodiments, the operations 700 further include processing, by the process, the second plurality of events of the second stream, the second plurality of events including a second flip event indicating that the process is to switch back to the first event stream; and switching, by the process, from the second event stream back to the first event stream.

Figure 8:
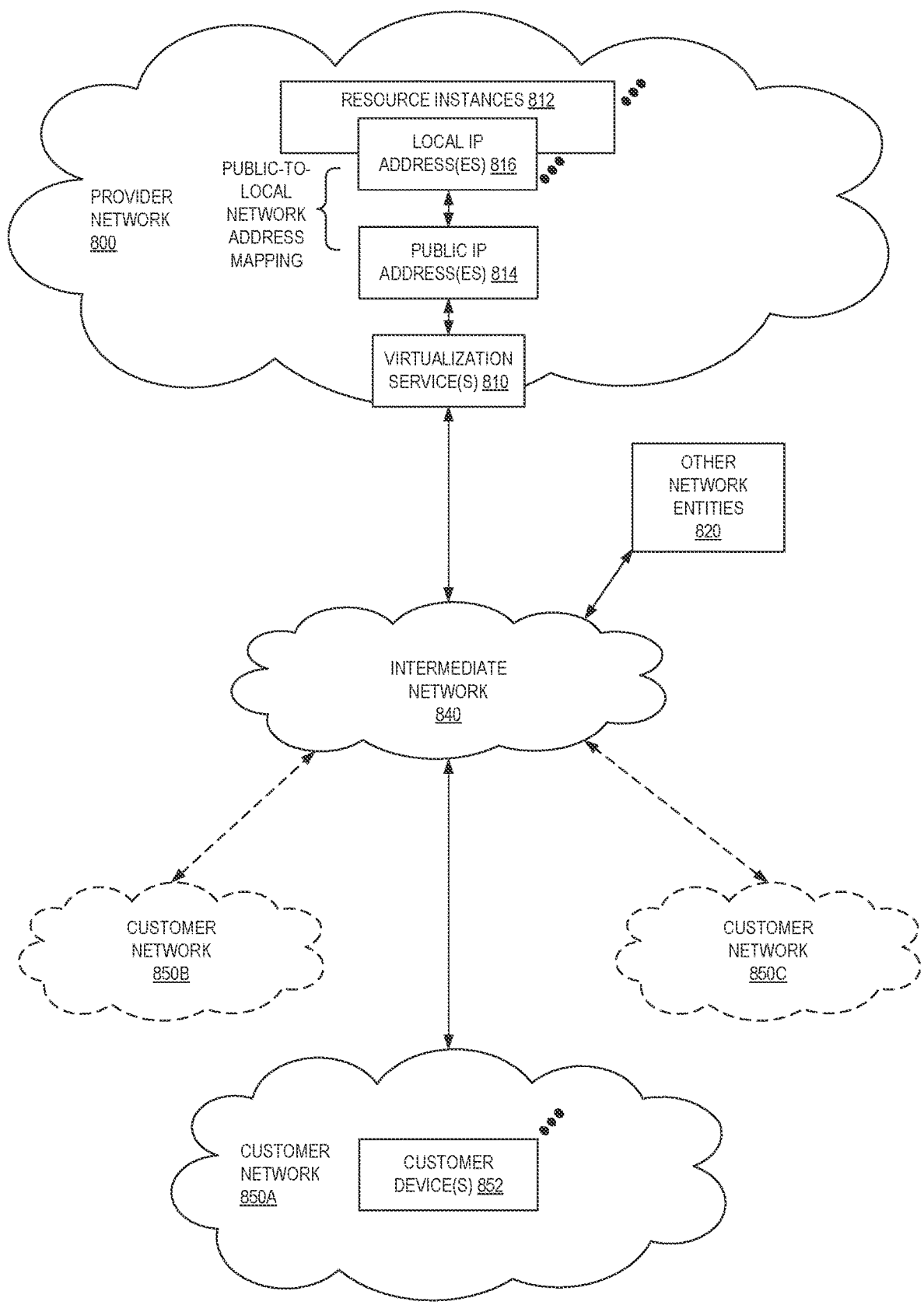
FIG. 8 illustrates an example provider network environment according to some embodiments.

FIG. 8 illustrates an example provider network (or "service provider system") environment according to some embodiments. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some embodiments, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
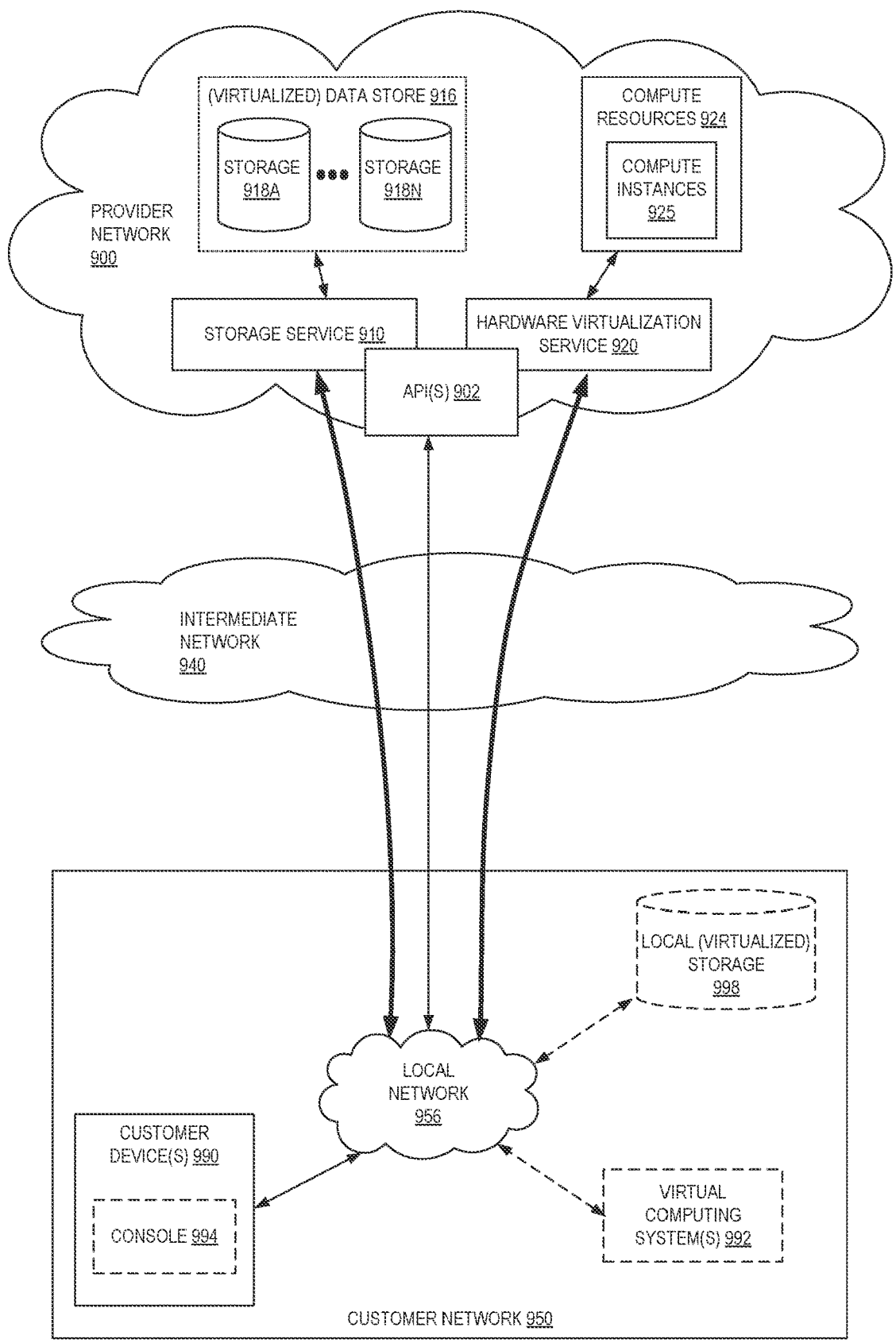
FIG. 9 is a block diagram of an example provider network that provides a storage service and a hardware virtualization service to customers according to some embodiments.

FIG. 9 is a block diagram of an example provider network environment that provides a storage service and a hardware virtualization service to customers, according to some embodiments. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some embodiments, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some embodiments, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some embodiments, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some embodiments, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
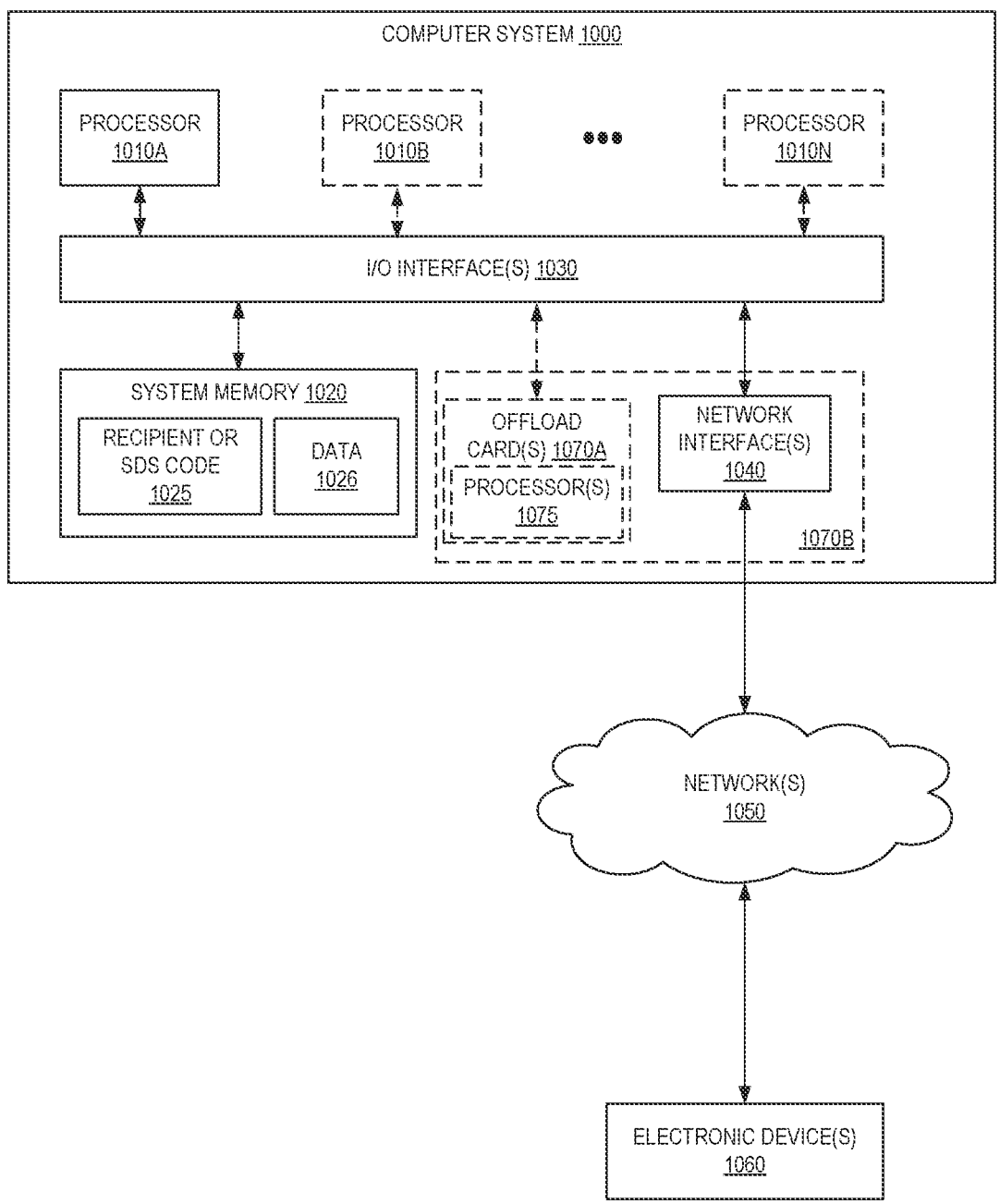
FIG. 10 is a block diagram illustrating an example computer system that can be used in some embodiments.

In some embodiments, a system that implements a portion or all of the techniques described herein can include a general-purpose computer system, such as the computer system 1000 illustrated in FIG. 10, that includes, or is configured to access, one or more computer-accessible media. In the illustrated embodiment, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various embodiments the computer system 1000 can include one computing device or any number of computing devices configured to work together as a single computer system 1000.

In various embodiments, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various embodiments, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various embodiments, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1020 as recipient or SDS code 1025 (e.g., executable to implement, in whole or in part, a recipient 112 or SDS service 110) and data 1026.

In some embodiments, the I/O interface 1030 can be configured to coordinate I/O traffic between the processor 1010, the system memory 1020, and any peripheral devices in the device, including the network interface 1040 and/or other peripheral interfaces (not shown). In some embodiments, the I/O interface 1030 can perform any necessary protocol, timing, or other data transformations to convert data signals from one component (e.g., the system memory 1020) into a format suitable for use by another component (e.g., the processor 1010). In some embodiments, the I/O interface 1030 can include support for devices attached through various types of peripheral buses, such as a variant of the Peripheral Component Interconnect (PCI) bus standard or the Universal Serial Bus (USB) standard, for example. In some embodiments, the function of the I/O interface 1030 can be split into two or more separate components, such as a north bridge and a south bridge, for example. Also, in some embodiments, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various embodiments, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations, such as pausing and/or un-pausing compute instances, launching and/or terminating compute instances, performing memory transfer/copying operations, etc. These management operations can, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and can not coordinate with (or service) any separate hypervisor.

In some embodiments, the system memory 1020 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C # or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
    obtaining, by a process executed by an electronic device, a plurality of events in a first event stream, wherein obtaining the plurality of events comprises receiving the plurality of events from a first fanout component;
    determining, by the process, that a first event of the plurality of events in the first event stream is a flip event indicating that the process is to switch from the first event stream to a second event stream that is different than the first event stream, the flip event including an identifier of a second event within the second event stream, wherein the flip event further includes an identifier of a second fanout component that is distinct from the first fanout component; and
    switching, by the process, from the first event stream to the second event stream, the switching including obtaining a second plurality of events of the second event stream based at least in part on use of the identifier of the second event, wherein obtaining the second plurality of events of the second event stream comprises transmitting the identifier of the second event to the second fanout component and receiving the second plurality of events from the second fanout component.

2. The computer-implemented method of claim 1, wherein the flip event further includes an identifier of a third event within the first stream that is later in sequence than the first event, and wherein the method further comprises:
  after the determining that the first event is a flip event and prior to the switching from the first event stream to the second event stream, processing one or more additional events of the plurality of events of the first event stream until reaching or processing the third event.

3. The computer-implemented method of claim 2, further comprising:
  as part of the processing of the one or more events of the first event stream, updating, by the process, a data structure with entries including identifiers of other events of the second event stream corresponding to the one or more events of the first event stream.

4. The computer-implemented method of claim 3, further comprising:
  after the switching from the first event stream to the second event stream, processing the second plurality of events, the processing including performing lookups into the data structure to determine which of the second plurality of events have already been processed.

5. The computer-implemented method of claim 4, further comprising:
  determining, by the process based on use of the data structure, that a lookup stopping condition has been satisfied; and
  stopping the performing of lookups with the data structure during processing of additional events of the second event stream.

6. The computer-implemented method of claim 5, wherein the lookup stopping condition is satisfied when an amount of lookup misses into the data structure over a recent window meets or exceeds a threshold.

7. The computer-implemented method of claim 1, wherein the flip event further includes a target recipient value, the method further comprising:
  determining, by the process based on the target recipient value, that the flip event does pertain to the process and thus to perform the switching from the first event stream to the second event stream.

8. The computer-implemented method of claim 7, wherein the target recipient value includes at least one of:
  a set of one or more process or host identifiers that uniquely identifies one or more specific processes or hosts; or
  a value that does not directly identify any single process or host but that can be evaluated by the process to determine whether the flip event is meant for the process or host.

9. The computer-implemented method of claim 1, further comprising:
  processing, by the process, the second plurality of events of the second event stream, the second plurality of events including a second flip event indicating that the process is to switch back to the first event stream; and
  switching, by the process, from the second event stream back to the first event stream.

10. A system comprising:
  a first one or more electronic devices to implement a first fanout component in a multi-tenant provider network;
  a second one or more electronic devices to implement a second fanout component in the multi-tenant provider network; and
  a third one or more electronic devices to execute code for a process in the multi-tenant provider network, the code including instructions that upon execution cause the process to:
    obtain a plurality of events in a first event stream from the first fanout component wherein to obtain the plurality of events the process is to receive the plurality of events from a first fanout component;
    determine that a first event of the plurality of events in the first event stream is a flip event indicating that the process is to switch from the first event stream to a second event stream that is different than the first event stream, the flip event including an identifier of a second event within the second event stream, wherein the flip event further includes an identifier of a second fanout component that is distinct from the first fanout component; and
    switch from the first event stream to the second event stream, including obtaining a second plurality of events of the second stream from the second fanout component based at least in part on use of the identifier of the second event, wherein to obtain the second plurality of events of the second event stream the process is to transmit the identifier of the second event to the second fanout component and receive the second plurality of events from the second fanout component.

11. The system of claim 10, wherein the flip event further includes an identifier of a third event within the first stream, and wherein the code further includes instructions that upon execution cause the process to:
  after the determination that the first event is a flip event and prior to the switch from the first event stream to the second event stream, process one or more additional events of the plurality of events of the first event stream until reaching the third event.

12. The system of claim 11, wherein the code further includes instructions that upon execution cause the process to:
  as part of the processing of the one or more events of the first event stream, update a data structure with entries including identifiers of other events of the second event stream.

13. The system of claim 12, wherein the code further includes instructions that upon execution cause the process to:
  after the switch from the first event stream to the second event stream, process the second plurality of events, including performing lookups into the data structure for the second plurality of events to determine which of the second plurality of events have already been processed.

14. The system of claim 10, wherein the flip event further includes an identifier of a second fanout component that is distinct from the first fanout component.

15. The system of claim 10, wherein the flip event further includes a target recipient value, and wherein the code further includes instructions that upon execution cause the process to:

determine, based on the target recipient value, that the flip event does pertain to the process and thus to perform the switching from the first event stream to the second event stream.

16. The system of claim 15, wherein the target recipient value is one of:
    a set of one or more process or host identifiers that uniquely identifies one or more specific processes or hosts; or
    a value that does not directly identify any single process or host but that can be evaluated by the process to determine whether the flip event is meant for the process or host.

17. A computer-implemented method comprising:
    obtaining, by a process executed by an electronic device, a plurality of events in a first event stream;
    determining, by the process, that a first event of the plurality of events in the first event stream is a flip event indicating that the process is to switch from the first event stream to a second event stream that is different than the first event stream, the flip event including an identifier of a second event within the second event stream, wherein the flip event further includes an identifier of a third event within the first stream that is later in sequence than the first event;
    after the determining that the first event is a flip event and prior to switching from the first event stream to the second event stream, processing an additional one or more events of the plurality of events of the first event stream until reaching or processing the third event, wherein the processing of the one or more events comprises updating, by the process, a data structure with entries including identifiers of other events of the second event stream corresponding to the one or more events of the first event stream;
    switching, by the process, from the first event stream to the second event stream, the switching including obtaining a second plurality of events of the second event stream based at least in part on use of the identifier of the second event; and
    after the switching from the first event stream to the second event stream, processing the second plurality of events, the processing including performing lookups into the data structure to determine which of the second plurality of events have already been processed, wherein processing the second plurality of events includes:
        determining, by the process based on use of the data structure, that a lookup stopping condition has been satisfied; and
        stopping the performing of lookups with the data structure during processing of additional events of the second event stream.

18. The computer-implemented method of claim 17, wherein the lookup stopping condition is satisfied when an amount of lookup misses into the data structure over a recent window meets or exceeds a threshold.

19. The computer-implemented method of claim 17, wherein the flip event further includes a target recipient value, the method further comprising:
    determining, by the process based on the target recipient value, that the flip event does pertain to the process and thus to perform the switching from the first event stream to the second event stream.

20. The computer-implemented method of claim 19, wherein the target recipient value includes at least one of:
    a set of one or more process or host identifiers that uniquely identifies one or more specific processes or hosts; or
    a value that does not directly identify any single process or host but that can be evaluated by the process to determine whether the flip event is meant for the process or host.

* * * * *